(12) United States Patent
Rodriguez

(10) Patent No.: US 11,810,401 B1
(45) Date of Patent: Nov. 7, 2023

(54) METHODS AND SYSTEMS FOR ENHANCING USER LIVENESS DETECTION

(71) Applicant: Daon Technology, Dublin (IE)

(72) Inventor: Raphael A. Rodriguez, Marco Island, FL (US)

(73) Assignee: Daon Technology, Dublin (IE)

( * ) Notice: Subject to any disclaimer, the term of this patent is extended or adjusted under 35 U.S.C. 154(b) by 0 days.

(21) Appl. No.: 18/301,369

(22) Filed: Apr. 17, 2023

(51) Int. Cl.
| | | |
|---|---|---|
| *G06F 21/32* | (2013.01) | |
| *G06N 3/08* | (2023.01) | |
| *G06N 3/04* | (2023.01) | |
| *G06V 40/40* | (2022.01) | |
| *H04L 9/06* | (2006.01) | |
| *G06V 40/50* | (2022.01) | |

(52) U.S. Cl.
CPC ............ *G06V 40/40* (2022.01); *G06V 40/53* (2022.01); *H04L 9/0643* (2013.01); *G06V 2201/10* (2022.01)

(58) Field of Classification Search
CPC .... G06V 40/45; G06V 40/172; G06V 10/141; G06V 40/168; G06V 40/167; G06V 10/17; G06V 40/166; G06V 40/161; G06V 40/20; G06F 18/22; H04L 63/0853; H04L 63/0861; H04W 12/065; H04W 12/12; H04W 12/65
See application file for complete search history.

(56) References Cited

U.S. PATENT DOCUMENTS 10,152,634 B2 * 12/2018 Kamath ............... H04N 21/254
2021/0117529 A1 * 4/2021 Zamora Martínez ... G06F 21/32

* cited by examiner

*Primary Examiner* — Michael J Vanchy, Jr.
(74) *Attorney, Agent, or Firm* — Kevin McDermott, Esq.

(57) ABSTRACT

A method for enhancing user liveness detection is provided that includes receiving image data of a user that includes items of metadata. Moreover, the method includes comparing each item of metadata associated with the received image data against a corresponding item of metadata associated with record image data of the user, and determining whether each item of metadata associated with the received image data matches the corresponding item of metadata. In response to determining at least one item of metadata associated with the received image data does not match the corresponding item of metadata, the method deems the received image data to be genuine and from a live person. In response to determining all items of metadata associated with the received image match the corresponding item of metadata, the method deems the received image data to be fraudulent and not from a living person.

6 Claims, 4 Drawing Sheets

| ITEMS OF METADATA | |
|---|---|
| 1. | TIME STAMP |
| 2. | PIXEL DENSITY OF IMAGE DATA |
| 3. | ANGLE BETWEEN CAMERA AND BIOMETRIC MODALITY |
| 4. | INTENSITY OF COLOR IN IMAGE DATA |
| 5. | DISTANCE FROM CAMERA TO BIOMETRIC MODALITY |
| 6. | FOCUS TIME |
| 7. | AMBIENT LIGHT |
| 8. | DEFECTS IN IMAGE DATA |
| 9. | BACKGROUND IMAGES IN IMAGE DATA |
| 10. | SENSOR TEMPERATURE(S) |

METHODS AND SYSTEMS FOR
ENHANCING USER LIVENESS DETECTION

BACKGROUND OF THE INVENTION

This invention relates generally to user image data received during remote authentication transactions, and more particularly, to methods and systems for enhancing user liveness detection based on user image data received during remote authentication transactions.

People conduct transactions with service providers in person and remotely over the Internet. Network-based transactions conducted over the Internet may involve purchasing items from a merchant website or accessing confidential information from a website. Service providers who own and operate such websites typically require a person be successfully authenticated before allowing him or her to conduct a desired network-based transaction.

For service providers who require biometric authentication, people provide a claim of identity and remotely captured data regarding a biometric modality. However, imposters have been known to impersonate people by providing a false claim of identity supported by fraudulent data in an effort to deceive an entity into concluding the imposter is the person he or she claims to be. Such impersonations are known as spoofing.

Impostors have been known to use many methods to obtain or create fraudulent data for a biometric modality of another person that can be submitted during biometric authentication transactions. For example, imposters have been known to obtain two-dimensional pictures from social networking sites which can be presented to a camera during authentication to support a false claim of identity. Imposters have also been known to make physical models of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine data of a biometric modality of a person. The imposters use the obtained data for playback during fraudulent network-based authentication transactions. Such fraudulent data are difficult to detect using known liveness detection methods. Consequently, generating accurate network-based biometric authentication transaction results with data for a biometric modality captured from a person at a remote location depends on verifying the physical presence of the person during the authentication transaction as well as accurately verifying the identity of the person with the captured data. Verifying that the data for a biometric modality of a person provided or received during a network-based biometric authentication transaction conducted at a remote location is from a live person is known as liveness detection or anti-spoofing.

Liveness detection methods have been known to use structure derived from motion of a biometric modality, such as a person's face, to distinguish a live person from a photograph. Other methods have been known to analyze sequential images of eyes to detect eye blinks and thus determine if an image of a face is from a live person. Passive liveness detection methods are known which evaluate image data for compliance with several different quality features in order to be considered quality biometric image data that can be used to generate accurate and trustworthy liveness detection and authentication transaction results. Such quality features include the sharpness, resolution, illumination, roll orientation, and pose deviation of an image. However, such known liveness detection methods may not provide high confidence liveness detection support for entities dependent upon accurate biometric authentication transaction results.

Thus, it would be advantageous and an improvement over the relevant technology to provide a method, and a computer capable of enhancing the accuracy and trustworthiness of liveness detection results.

BRIEF DESCRIPTION OF THE INVENTION

In one aspect, a method for enhancing user liveness detection is provided that includes receiving, by an electronic device, image data of a user. The image data includes items of metadata. Moreover, the method includes comparing each item of metadata associated with the received image data against a corresponding item of metadata associated with record image data of the user, and determining whether each item of metadata associated with the received image data matches the corresponding item of metadata. In response to determining at least one item of metadata associated with the received image data does not match the corresponding item of metadata associated with the record image data of the user, the method includes deeming the received image data to be genuine and from a live person. In response to determining all items of metadata associated with the received image match the corresponding item of metadata associated with the record image data, the method includes deeming the received image data to be fraudulent and not from a living person.

In one embodiment, when the received image data is deemed genuine, a biometric template is created from the received image data, a biometric authentication transaction is conducted using the biometric template and a record biometric template of the user, and the user is permitted to conduct a desired transaction when the user is successfully biometrically authenticated.

In another embodiment, when the received image data is deemed to be fraudulent, a cryptographic image hash of the received image data is calculated, the calculated cryptographic image hash is compared against a record cryptographic image hash of the user, and the received image data is determined to be a replay of the record image data when the hashes match.

In yet another embodiment, the items of metadata include: a date and time stamp indicating when the image data was captured; pixel density of the image data indicating the resolution of the image; an angle indicating the orientation of the camera relative to the biometric modality of the user; intensity of color in the image data indicating the brightness and contrast of the image; a distance from the biometric modality of the user to a camera capturing the image data of the biometric modality, the distance indicating the proximity of the user to the camera; time taken for the camera to focus on the biometric modality; ambient illumination in the image data; defects in the image data; background images in the image data; and the temperature of sensors in the camera while capturing the image data.

Another aspect of the present disclosure provides a non-transitory computer-readable recording medium in an electronic device capable of enhancing liveness detection. The non-transitory computer-readable recording medium stores instructions which when executed by a hardware processor performs the steps of the methods described above.

In another aspect, an electronic device for enhancing user liveness detection is provided that includes a processor and a memory. The memory is configured to store data and the electronic device is associated with a network. The memory is also in communication with the processor and has instructions stored thereon which, when read and executed by the processor, cause the electronic device to receive image data of a user. The image data includes items of metadata. Moreover, the instructions when read and executed by the processor, cause the electronic device to compare each item of metadata associated with the received image data against a corresponding item of metadata associated with record image data of the user and determine whether each item of metadata associated with the received image data matches the corresponding item of metadata. In response to determining at least one item of metadata associated with the received image data does not match the corresponding item of metadata associated with the record image data of the user, the instructions when read and executed by the processor, cause the electronic device to deem the received image data to be genuine and from a live person. In response to determining all items of metadata associated with the received image match the corresponding item of metadata associated with the record image data, the instructions when read and executed by the processor, cause the electronic device to deem the received image data to be fraudulent and not from a living person.

In an embodiment, the instructions when read and executed by the processor, further cause the electronic device to create a biometric template from the received image data when the received image data is deemed genuine, conduct a biometric authentication transaction using the biometric template and a record biometric template of the user, and permit the user to conduct a desired transaction when the user is successfully biometrically authenticated.

In yet another embodiment, when the received image data is deemed to be fraudulent the instructions when read and executed by the processor, further cause the electronic device to calculate a cryptographic image hash of the received image data, compare the calculated cryptographic image hash against a record cryptographic image hash of the user, and when the hashes match, determine the received image data is a replay of the record image data.

In yet another embodiment, the items of metadata include: a date and time stamp indicating when the image data was captured; pixel density of the image data indicating the resolution of the image; an angle indicating the orientation of the camera relative to the biometric modality of the user; intensity of color in the image data indicating the brightness and contrast of the image; a distance from the biometric modality of the user to a camera capturing the image data of the biometric modality, the distance indicating the proximity of the user to the camera; time taken for the camera to focus on the biometric modality; ambient illumination in the image data; defects in the image data; background images in the image data; and the temperature of sensors in the camera while capturing the image data.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
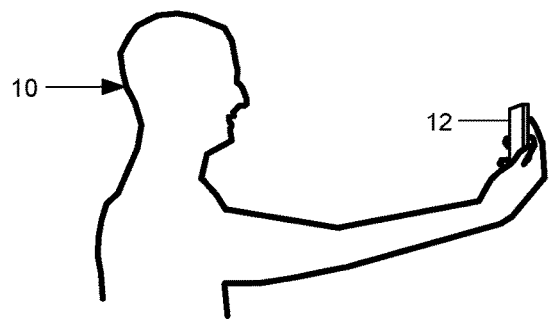
FIG. 1 is a side view of a person operating an example electronic device.

FIG. 1 is a side view of a person 10 operating an example electronic device 12 to capture data of a biometric modality from his or herself. The person from whom such data is caught is referred to herein as a user 10. The user 10 typically operates the electronic device 12 during capture. However, a different person may operate the electronic device 12 while the electronic device 12 captures data of a biometric modality of the user 10.

Figure 2:
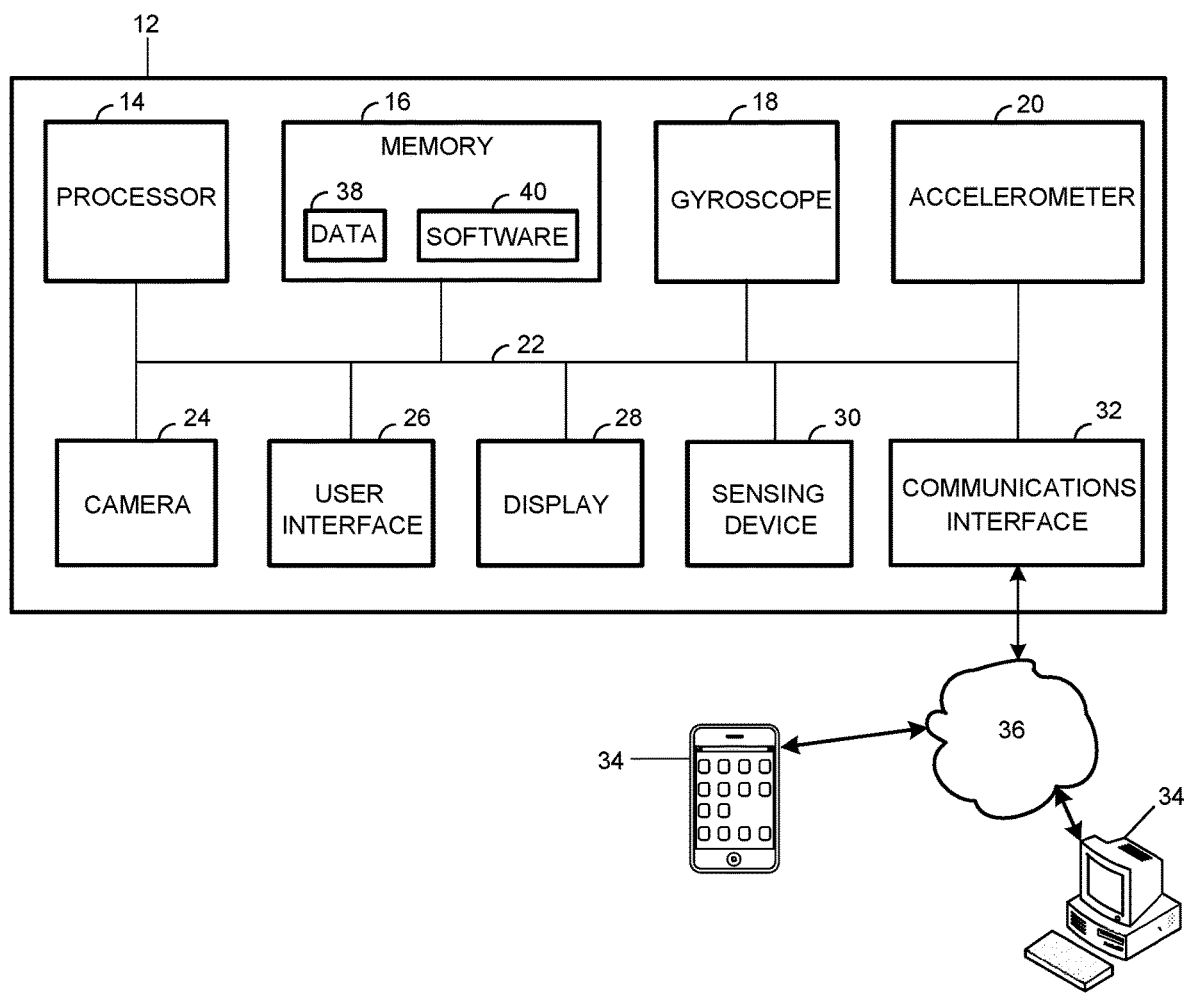
FIG. 2 is a diagram of the example electronic device as shown in FIG. 1.

FIG. 2 is a diagram of the example electronic device 12 used for enhancing user liveness detection according to an embodiment of the present disclosure. The electronic device 12 includes components such as, but not limited to, one or more processors 14, a memory 16, a gyroscope 18, one or more accelerometers 20, a bus 22, a camera 24, a user interface 26, a display 28, a sensing device 30 and a communications interface 32. General communication between the components in the electronic device 12 is provided via the bus 22.

In FIG. 2, the electronic device 12 can be any electronic device capable of at least downloading applications over the Internet, running applications, capturing and storing data temporarily and/or permanently, and otherwise performing any and all functions, methods and/or algorithms described herein. One example of the electronic device 12 is a smart phone. Other examples of the electronic device 12 include, but are not limited to, a cellular phone, any wireless handheld consumer electronic device, a tablet computer, a phablet computer, a laptop computer, a personal computer (PC), and any type of server or computer implemented as a network server or network computer.

The processor 14 executes instructions, or computer programs, stored in the memory 16. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 16 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 16 may be used to store any type of data 38, for example, data records of users. Each data record is typically for a respective user. The data record for each user may include data such as, but not limited to, record biometric data, items of metadata associated with the record biometric data, record biometric templates, cryptographic image hashes of record biometric data, and personal data of the user. A biometric template can be any type of mathematical representation of biometric modality data. Biometric modality data is the data of a biometric modality of a person.

Biometric modalities include, but are not limited to, voice, face, finger, iris, palm, and any combination of these or other modalities. Biometric modality data is the data of a biometric modality of a person captured by the electronic device 12. As used herein, capture means to record data temporarily or permanently, for example, biometric modality data of a person. Biometric modality data may be in any form including, but not limited to, image data and audio data. Image data may be a digital image, a sequence of digital images, or a video. Each digital image is included in a frame. The biometric modality data in the data record may be processed to generate at least one biometric modality template. For the methods and systems described herein, the biometric modality is face biometric data captured as an image. Alternatively, the biometric modality may be for any biometric modality or any combination of biometric modalities that may be captured as an image.

Biometric modality data may be captured in any manner. For face biometric data, the camera 24 may record image data of the face of a user by taking one or more photographs or digital images of the user, or by taking a video of the user. The camera 24 may record a sequence of digital images at irregular or regular intervals. A video is an example of a sequence of digital images being captured at a regular interval. Captured biometric modality data may be temporarily or permanently recorded in the electronic device 12 or in any device capable of communicating with the electronic device 12. Alternatively, the biometric modality data may not be stored. The record biometric data is raw biometric data processed to generate at least one record biometric template that may be used to verify the identity of a user.

The term "personal data" as used herein includes any demographic information regarding a user as well as contact information pertinent to the user. Such demographic information includes, but is not limited to, a user's name, age, date of birth, street address, email address, citizenship, marital status, and contact information. Contact information can include devices and methods for contacting the user.

Additionally, the memory 16 can be used to store any type of software 40. As used herein, the term "software" is intended to encompass an executable computer program that exists permanently or temporarily on any non-transitory computer-readable recordable medium that causes the electronic device 12 to perform at least a portion of the functions, methods, and/or algorithms described herein. Such functions include, but are not limited to, calculating feature values, feature vectors, and confidence scores. Application programs are software and include, but are not limited to, operating systems, Internet browser applications, authentication applications, user liveness detection applications, and any special computer program that manages the relationship between application software and any suitable variety of hardware that helps to make-up a computer system or computing environment. The software may also include computer programs that implement buffers and use RAM to store temporary data.

Authentication applications enable the electronic device 12 to conduct user verification and identification (1:C) transactions with any type of authentication data, where "C" is a number of candidates.

The process of verifying the identity of a user is known as a verification transaction. Typically, during a verification transaction a biometric template is generated from biometric modality data of a user captured during the transaction. The generated biometric template is compared against the corresponding record biometric template of the user and a matching score is calculated for the comparison. If the matching score meets or exceeds a threshold score, the identity of the user is verified as true. Alternatively, the captured user biometric modality data may be compared against the corresponding record biometric modality data to verify the identity of the user. Liveness detection applications facilitate determining whether captured data of a biometric modality of a person is of a live person.

The gyroscope 18 and the accelerometer 20 generate data regarding rotation and translation of the electronic device 12 that may be communicated to the processor 14 and the memory 16 via the bus 22. The electronic device 12 may alternatively not include the gyroscope 18 or the accelerometer 20 or may not include either.

The camera 24 captures image data. The camera 24 can be one or more imaging devices configured to record image data of at least a portion of the body of a user including any biometric modality of the user while utilizing the electronic device 12. Moreover, the camera 24 is capable of recording image data under any lighting conditions including infrared light. The camera 24 may be integrated into the electronic device 12 as one or more front-facing cameras and/or one or more rear facing cameras that each incorporates a sensor, for example and without limitation, a CCD or CMOS sensor. Alternatively, the camera 24 can be external to the electronic device 12.

The user interface 26 and the display 28 allow interaction between a user and the electronic device 12. The display 28 may include a visual display or monitor that displays information to a user. For example, the display 28 may be a Liquid Crystal Display (LCD), active matrix display, plasma display, or cathode ray tube (CRT). The user interface 26 may include a keypad, a keyboard, a mouse, an infrared illuminator, a microphone, one or more cameras, and/or speakers. The one or more cameras may be able to capture images under any lighting conditions including infrared light.

Moreover, the user interface 26 and the display 28 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the device 12 to enter data, change settings, control functions, etc. Consequently, when the touch screen is touched, the user interface 26 communicates this change to the processor 14, and settings can be changed or user entered information can be captured and stored in the memory 16. The display 28 may function as an illumination source to apply illumination to a biometric modality of a user while data for the biometric modality is captured from the user.

When the user interface 26 includes an infrared illuminator and one or more cameras, the infrared illuminator may project infrared light or near infrared light on a biometric modality of a user, and the one or more cameras may detect reflections of the projected light off the biometric modality. The reflections may be off of any number of points on the biometric modality. The detected reflections may be communicated as reflection data to the processor 14 and the memory 16. The processor 14 may use the reflection data to create at least a three-dimensional model of the biometric modality and a sequence of two-dimensional digital images. For example, the reflections from at least thirty thousand discrete points on the biometric modality may be detected and used to create a three-dimensional model of the biometric modality.

The sensing device 30 may include Radio Frequency Identification (RFID) components or systems for receiving information from other devices. The sensing device 30 may alternatively, or additionally, include components with Bluetooth, Near Field Communication (NFC), infrared, or other similar capabilities. The electronic device 12 may alternatively not include the sensing device 30.

The communications interface 32 provides the electronic device 12 with two-way data communications. Moreover, the communications interface 32 enables the electronic device 12 to conduct wireless communications such as cellular telephone calls and to wirelessly access the Internet over the network 36. By way of example, the communications interface 32 may be a digital subscriber line (DSL) card or modem, an integrated services digital network (ISDN) card, a cable modem, or a telephone modem to provide a data communication connection to a corresponding type of telephone line. As another example, the communications interface 32 may be a local area network (LAN) card (e.g., for Ethernet™ or an Asynchronous Transfer Model (ATM) network) to provide a data communication connection to a compatible LAN. As yet another example, the communications interface 32 may be a wire or a cable connecting the electronic device 12 with a LAN, or with accessories such as, but not limited to, biometric modality data capture devices. Further, the communications interface 32 may include peripheral interface devices, such as a Universal Serial Bus (USB) interface, a PCMCIA (Personal Computer Memory Card International Association) interface, and the like. Thus, it should be understood the communications interface 32 may enable the electronic device 12 to conduct any type of wireless or wired communications such as, but not limited to, accessing the Internet. Although the electronic device 12 includes a single communications interface 32, the electronic device 12 may alternatively include multiple communications interfaces 32.

The communications interface 32 also allows the exchange of information across the network 36. The exchange of information may involve the transmission of radio frequency (RF) signals through an antenna (not shown). Moreover, the exchange of information may be between the electronic device 12 and any other computer systems 34 and any other electronic devices 34 capable of communicating over the network 36. The computer systems 34 and the electronic devices 34 typically include components similar to the components included in the electronic device 12.

The network 36 may be a 5G communications network. Alternatively, the network 36 may be any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 38 may also be any type of wired network or a combination of wired and wireless networks.

Examples of other computer systems 34 include computer systems of service providers such as, but not limited to, financial institutions, medical facilities, national security agencies, merchants, and authenticators. Examples of other electronic devices 34 include, but are not limited to, smart phones, tablet computers, phablet computers, laptop computers, personal computers and cellular phones. The other electronic devices 34 may be associated with any individual or with any type of entity including, but not limited to, commercial and non-commercial entities. The electronic devices 12, 34 may alternatively be referred to as computer systems or information systems, while the computer systems 34 may alternatively be referred to as electronic devices or information systems.

Figures 3, 4:
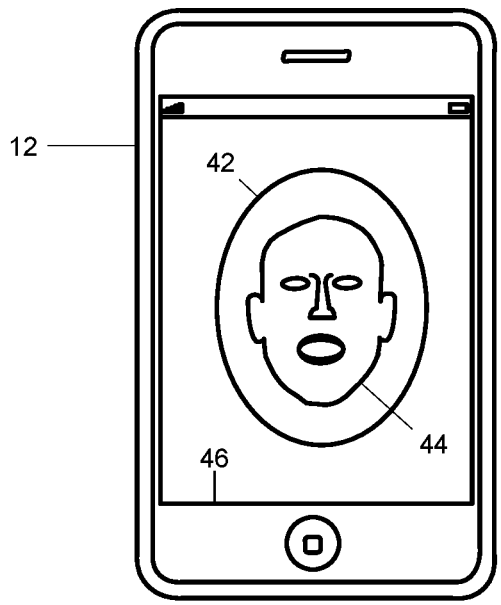
FIG. 3 is a front view of the example electronic device displaying an example visual aid and an image of the person within the visual aid.
FIG. 4 is a diagram illustrating a table including example items of metadata.

FIG. 3 is a front view of the electronic device 12 displaying an example visual aid 42 and a facial image 44 of the user 10 positioned within the visual aid 42. The visual aid 42 may be displayed by the electronic device 12 and functions as a guide that enables users to capture data usable for enhancing the accuracy of user liveness detection and generating trustworthy verification transaction results. One example shape of the visual aid 42 is an oval. Other example shapes include, but are not limited to, a circle, a square, a rectangle, and an outline of the biometric modality desired to be captured. Moreover, the visual aid 42 may be any shape defined by lines and/or curves. However, it is not necessary that the visual aid 42 be displayed by the electronic device 12. The visual aid 42 may alternatively be a part of the electronic device 12 itself. For example, the visual aid 42 may be a perimeter 46 of the electronic device 12 display screen.

The image 44 is to be positioned within the visual aid 42 while capturing data of a biometric modality of the user. The image 44 may be close to the visual aid 42 border but not outside the border. Alternatively, a small percentage of the facial image 44 may be allowed to extend beyond the border. A small percentage may be between about zero and ten percent.

Image metadata is text information pertaining to captured image data that is embedded into the data or saved to a separate data file that is associated with the image data. Image metadata includes details relevant to the image data itself and to its production.

FIG. 4 is a diagram illustrating a table 48 including example items of image metadata. The items of image metadata include: a time stamp indicating the date and time image data was captured; the pixel density of captured image data; an angle between the camera and the biometric modality during capture of image data; the intensity of the color in the image data; the distance from the camera to the biometric modality during capture of image data; the time it takes for the camera to focus on the biometric modality being captured; ambient light in the captured image data; defects in captured image data, for example, shadow, blur and glare; background images in image data; and, the temperature of sensors during capture of image data.

Items of metadata are usually different between captured images. For example, different images are typically captured at different times. As a result, different images typically have a different time stamp. The pixel density of image data indicates the resolution of the image data and may differ between cameras and images. The angle between the camera and a biometric modality during capture is typically different for each captured image. The intensity of the color in captured image data indicates the brightness and contrast of the image which typically differs between images. The distance between the camera and the biometric data being captured is also typically different for each captured image. The time taken for the camera to focus properly on a biometric modality can depend on the distance between the camera and the biometric modality, and the camera itself. Thus, focus times should be different between different images.

The ambient light during image capture is also typically different between images. Each image may include defects like shadows, blur and glare. However, these defects are typically different for each image. Background images in a captured image are also typically different between images. For example, a person may take a selfie of his or herself in front of the Washington Monument and in front of the Lincoln Memorial at about the same time. Each image would include the person's face, but the backgrounds would be different. Consequently, images of the Washington Monument and the Lincoln Memorial in the background can be used to differentiate between the images. The temperature of sensors in a camera can indicate the operating condition of the camera. For example, during the summer the operating conditions may be warm and humid while during the winter operating conditions may be cold and dry.

Although ten items of metadata are included in the table 48, it is contemplated by the present disclosure that any number of items of metadata may alternatively be included in the table 48. The items of metadata are not limited to those listed in the table 48. The items of metadata may be the same or different than those shown in the table 48. The table 48 may include any items of metadata that facilitate enhancing liveness detection as described herein.

Because the items of metadata are usually different between captured images, the items of metadata can be used to facilitate determining whether image data provided during an authentication transaction is of a live person. That is, whether it is genuine or fraudulent. For example, the items of metadata from image data captured during an authentication transaction may be compared against the corresponding items of metadata associated with record image data of the user stored in the memory 16. If each item of metadata from image data provided during an authentication transaction matches the corresponding item of metadata associated with record image data of the user, the image data may not be of a live person and thus may be considered fraudulent. Instead of requiring each item of metadata to match to consider the image data may be fraudulent, any number of metadata items may be required to match to determine that image data may be fraudulent. For example, when three (3) or more items of metadata match the image data may be considered fraudulent. It is contemplated by the present disclosure that as the number of matching metadata items increases, the likelihood increases that the provided image data is not of a live person and may thus be fraudulent and a replay.

Creating a cryptographic image hash of image data and comparing the created cryptographic image hash against a record cryptographic image hash for the user may facilitate determining whether or not the image is a replay. A replay occurs when a copy of image data is provided as original image data. Only the exact same image will produce the same cryptographic image hash. Thus, when a cryptographic image hash generated for image data provided during an authentication transaction matches the record cryptographic image hash, the provided image data is necessarily fraudulent and a replay. Cryptographic image hashes may be generated using, for example, a secure hash algorithm 2.

People conduct transactions with service providers in person and remotely over the Internet. Network-based transactions conducted over the Internet may involve purchasing items from a merchant website, accessing confidential information from a website, or opening an account at a financial institution via the institution's website. Service providers who own and operate such websites typically require a person to be successfully authenticated before allowing him or her to conduct a desired network-based transaction.

For service providers who require biometric authentication, people provide a claim of identity and remotely captured data regarding a biometric modality. However, imposters have been known to impersonate people by providing a false claim of identity supported by fraudulent data to deceive an entity into concluding the imposter is the person he or she claims to be. Such impersonations are known as spoofing.

Impostors have been known to use many methods to obtain or create fraudulent data for a biometric modality of another person that can be submitted during biometric authentication transactions. For example, imposters have been known to obtain two-dimensional pictures from social networking sites which can be presented to a camera during authentication or directly submitted to an authenticating entity during authentication to support a false claim of identity. The imposters use the obtained data for playback during fraudulent network-based authentication transactions. Such fraudulent data are difficult to detect using known liveness detection methods which may not provide results that meet desired levels of accuracy and trustworthiness.

To address these problems, the electronic device 12 may receive image data of a user that includes items of metadata. Each item of metadata associated with the received image data can be compared against a corresponding item of metadata associated with record image data of the user, and based on the comparison the electronic device 12 can determine whether each item of metadata associated with the received image data matches the corresponding item of metadata. In response to determining at least one item of metadata associated with the received image data does not match the corresponding item of metadata associated with the record image data of the user, the electronic device 12 can deem the received image data to be genuine and from a live person. In response to determining all items of metadata associated with the received image data match the corresponding item of metadata associated with the record image data, the electronic device 12 can deem the received image data to be fraudulent and not from a living person.

Figure 5:
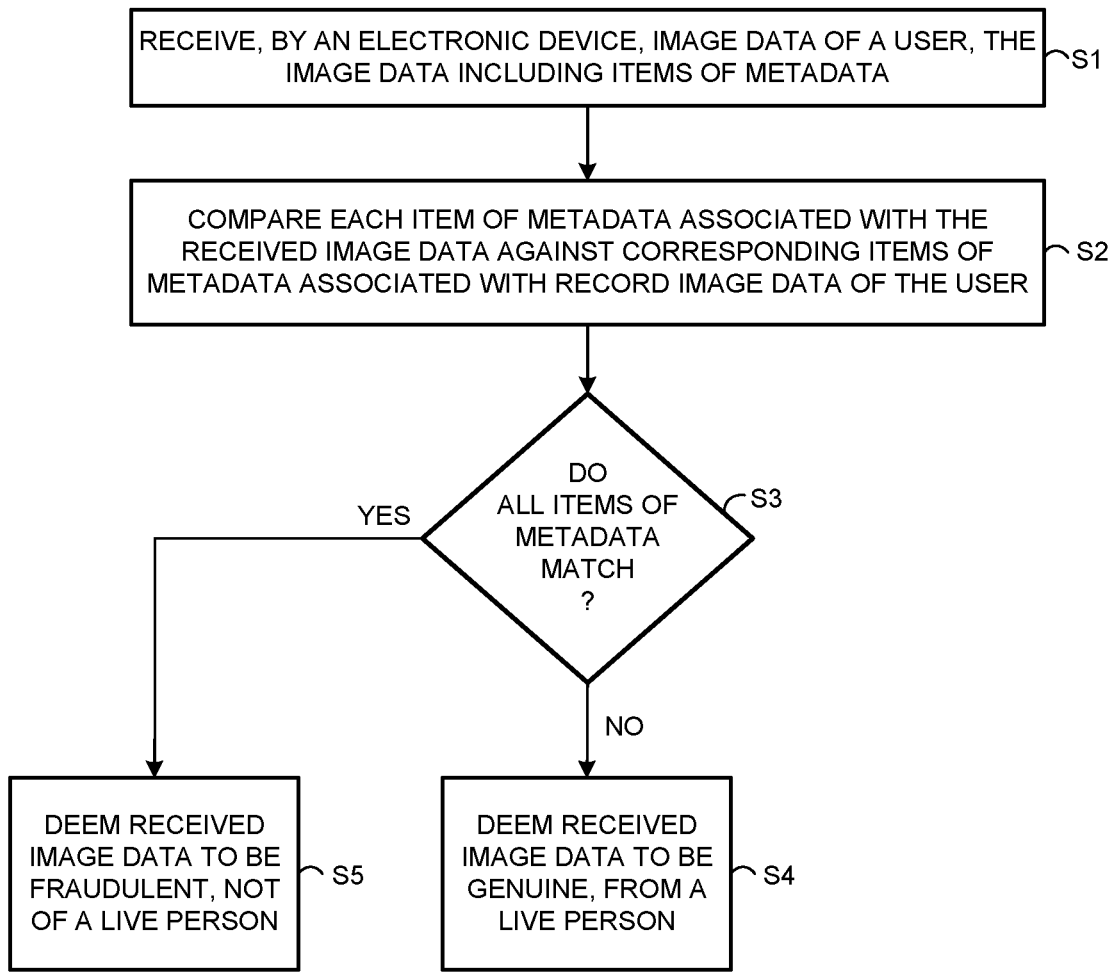
FIG. 5 is a flowchart illustrating an example method and algorithm for enhancing user liveness detection according to an embodiment of the present disclosure.

FIG. 5 is a flowchart illustrating an example method and algorithm for enhancing user liveness detection according to an embodiment of the present disclosure. A user may be required to prove he or she is live before being permitted to conduct, using the electronic device 12, a desired network-based transaction. Such network-based transactions include, but are not limited to, buying merchandise from a merchant service provider website, accessing top secret information from a computer system, and opening an account at a financial institution. FIG. 5 illustrates example steps performed when the electronic device 12 runs software 40 stored in the memory 16 to enhance user liveness detection.

In step S1, the software 40 executed by the processor 14 causes the electronic device 12 to receive image data of a user that includes items of metadata. The items of image metadata include, but are not limited to, a time stamp indicating the date and time image data was captured; the pixel density of captured image data; an angle between the camera and the biometric modality during capture of image data; the intensity of the color in the image data; the distance from the camera to the biometric modality during capture of image data; the time it takes for the camera to focus on the biometric modality being captured; ambient light in the captured image data; defects in captured image data, for example, shadow, blur and glare; background images in image data; and, the temperature of sensors during capture of image data.

In step S2, the software 40 executed by the processor 14 causes the electronic device 12 to compare each item of metadata associated with the received image data against a corresponding item of metadata associated with record image data of the user. Next, in step S3, the software 40 executed by the processor 14 causes the electronic device 12 to determine whether each item of metadata associated with the received image data matches the corresponding item of metadata associated with record image data of the user.

Next, in step S4, the software 40 executed by the processor 14 causes the electronic device 12 to deem the received image data is genuine and from a live person in response to determining at least one item of metadata associated with the received image data does not match the corresponding item of metadata associated with the record image data of the user. In step S5, the software 40 executed by the processor 14 causes the electronic device 12 to deem the received image data may be fraudulent and may not be from a living person in response to determining all items of metadata associated with the received image match the corresponding item of metadata associated with the record image data.

Instead of requiring each item of metadata to match to consider the image data may be fraudulent, any number of metadata items may be required to match to determine that image data may be fraudulent. For example, when three (3) or more items of metadata match the image data may be considered fraudulent. It is contemplated by the present disclosure that as the number of matching metadata items increases, the likelihood increases that the received image data is not of a live person and may thus be fraudulent and a replay.

Although the method and algorithm described with regard to FIG. 5 is for a single image, it is contemplated by the present disclosure that any number of images may be received by the electronic device 12 in step S1 and each image may be processed through steps S2 to S5. The results for each image may be combined into a single result to determine whether the received image data is of a live person. Alternatively, the results may be combined into a single result in any manner that facilitates determining whether the received image data is from a live person as described herein. Processing a plurality of images using the method and algorithm described regarding FIG. 5 facilitates enhancing the accuracy and trustworthiness of liveness detection results.

Using the methods and algorithms for enhancing user liveness detection as described herein enables enhancing the accuracy and trustworthiness of liveness detection results and authentication transaction results for entities dependent upon accurate biometric authentication transaction results.

The information shown in FIG. 6 includes some of the same information shown in FIG. 5 as described in more detail below. As such, features illustrated in FIG. 6 that are identical to features illustrated in FIG. 5 are identified using the same reference numerals used in FIG. 5.

Figure 6:
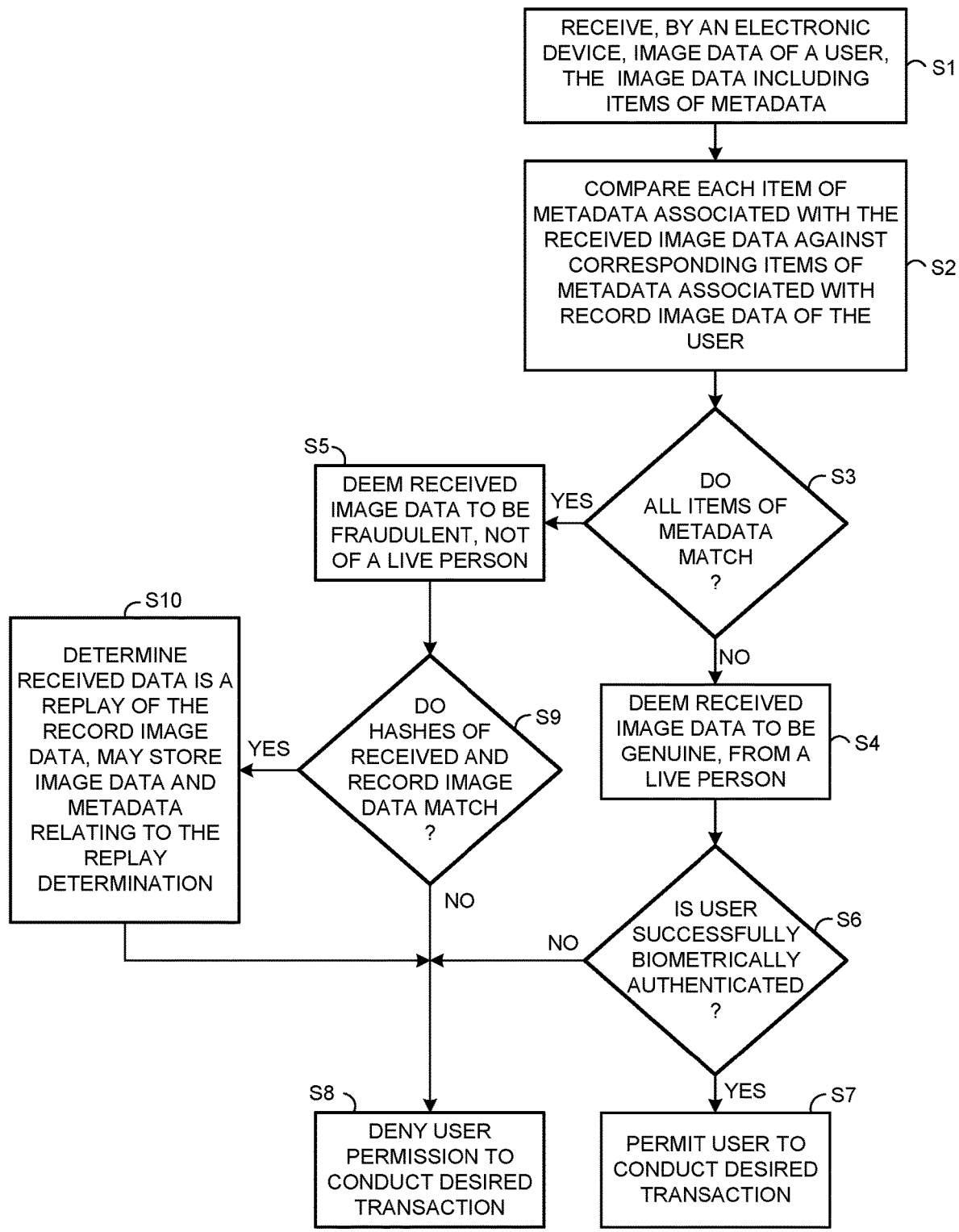
FIG. 6 is a flowchart illustrating an example method and algorithm for determining whether a user is permitted to conduct a desired network-based transaction according to an embodiment of the present disclosure.

FIG. 6 is a flowchart illustrating an example method and algorithm for determining whether a user is permitted to conduct a desired network-based transaction according to an embodiment of the present disclosure. A user may be required to prove he or she is live before being permitted to conduct, using the electronic device 12, a desired network-based transaction. Such network-based transactions include, but are not limited to, buying merchandise from a merchant service provider website, accessing top secret information from a computer system, and opening an account at a financial institution. FIG. 6 illustrates example steps performed when the electronic device 12 runs software 40 stored in the memory 16 to determine whether a user is permitted to conduct a desired network-based transaction.

This method is similar to that shown in FIG. 5. However, after deeming, in step S4, that the received image data is genuine and from a live person, in step S6, the software 40 executed by the processor 14 causes the electronic device 12 to conduct a biometric authentication transaction using the received image data. More specifically, the software 40 executed by the processor 14 causes the electronic device 12 to create a biometric template from the received image data and to compare the created biometric template against the corresponding record biometric template of the user stored in the memory 16. A matching score is calculated for the comparison. If the matching score meets or exceeds a threshold score, the identity of the user is verified as true. As a result, the user is successfully biometrically authenticated. Next, in step S7, the software 40 executed by the processor 14 causes the electronic device 12 to permit the user to conduct the desired transaction. Additionally, the received image data and created biometric template may be stored in the data record of the user for use during other authentication transactions.

When the matching score does not meet or exceed the threshold score, the identity of the user is not verified as true. As a result, in step S8, the software 40 executed by the processor 14 causes the electronic device 12 to deny the user permission to conduct the desired transaction. Additionally, the received image data and the created biometric template may not be stored.

After the received image data is deemed to be fraudulent in step S5, in step S9, the software 40 executed by the processor 14 causes the electronic device 12 to calculate a cryptographic image hash of the received image data. The hash may be calculated, for example, using a secure hash algorithm. The calculated cryptographic image hash is compared against the corresponding record cryptographic image hash of the user. When the calculated and record hashes match, in step S10, the software 40 executed by the processor 14 causes the electronic device 12 to determine the received image data is a replay of the record image data and may store the image data, metadata, and any other data relating to the replay determination in the memory 16. The stored image data, metadata and other data relating to the replay determination may be used to facilitate detecting replayed image data received in subsequent authentication transactions. However, when the calculated and record hashes do not match, the received data is not considered a replay of the record image data. As a result, the received image data and associated items of metadata may not be stored in the memory 16. Next, in step S8, the software 40 executed by the processor 14 causes the electronic device 12 to deny the user permission to conduct the desired transaction.

Although the calculated image hash is compared against a single record cryptographic image hash of the user as described herein, it is contemplated by the present disclosure that the calculated hash may be compared against any number of record hashes of the user and that results of the comparisons may be used in any manner to determine whether or not the received image data is a replay.

Using the methods and algorithms for determining whether a user is permitted to conduct a desired network-based transaction as described herein enables biometrically authenticating users and detecting replay images to thus enhance the accuracy and trustworthiness of liveness detection results and authentication transaction results for entities dependent upon accurate biometric authentication transaction results.

The example methods described herein may be conducted entirely by the electronic device 12, or partly on the electronic device 12 and partly on other electronic devices 34 and computer systems 34 operable to communicate with the electronic device 12 over the network 36. Moreover, the example methods described herein may be conducted entirely on the other computer systems 34 and other electronic devices 34. Thus, it is contemplated by the present disclosure that the example methods may be conducted on any combination of computers, computer systems 34, and electronic devices 34. Furthermore, data described herein as being stored in the memory 16 may alternatively be stored in any computer system 34 or electronic device 34 operable to communicate with the electronic device 12 over the network 36. Additionally, the example methods described herein may be implemented with any number and organization of computer program components. Thus, the methods described herein are not limited to specific computer-executable instructions. Alternative example methods may include different computer-executable instructions or components having more or less functionality than described herein.

The example methods for detecting user liveness described above should not be considered to imply a fixed order for performing the method steps. Rather, the method steps may be performed in any order that is practicable, including simultaneous performance of at least some steps. Moreover, the method steps may be performed in real time or in near real time. For any process described herein, there can be additional, fewer, or alternative steps performed in similar or alternative orders, or in parallel, within the scope of the various embodiments, unless otherwise stated. Furthermore, the invention is not limited to the embodiments of the methods described above in detail. Rather, other variations of the methods may be utilized within the spirit and scope of the claims.

What is claimed is:

1. A method for enhancing user liveness detection comprising the steps of:
   receiving, by an electronic device, image data of a user, the image data including items of metadata, wherein the items of metadata comprise
      a time stamp indicating when the image data was captured,
      pixel density of the image data indicating the resolution of the image,
      an angle indicating the orientation of the camera relative to the biometric modality of the user,
      intensity of color in the image data indicating the brightness and contrast of the image,
      a distance from the biometric modality of the user to a camera capturing the image data of the biometric modality, the distance indicating the proximity of the user to the camera,
      time taken for the camera to focus on the biometric modality,
      ambient illumination in the image data,
      defects in the image data,
      background images in the image data, and
      temperature of sensors in the camera while capturing the image data;
   comparing each item of the metadata associated with the received image data against a corresponding item of metadata associated with record image data of the user;
   determining that each item of the metadata associated with the received image data matches the corresponding item of metadata;
   and
   in response to determining all items of the metadata associated with the received image match the corresponding item of metadata associated with the record image data, deeming the received image data to be fraudulent and not from a living person.

2. The method according to claim 1, wherein when the received image data is deemed to be fraudulent, the method further comprises the steps of:
   calculating a cryptographic image hash of the received image data;
   comparing the calculated cryptographic image hash against a record cryptographic image hash of the user; and
   when the hashes match, determining the received image data is a replay of the record image data.

3. An electronic device for enhancing user liveness detection comprising:
   a processor; and
   a memory configured to store data, said electronic device being associated with a network and said memory being in communication with said processor and having instructions stored thereon which, when read and executed by said processor, cause said electronic device to:
   receive image data of a user, the image data including items of metadata, wherein the items of metadata comprise
      a time stamp indicating when the image data was captured,
      pixel density of the image data indicating the resolution of the image, an angle indicating the orientation of the camera relative to the biometric modality of the user, intensity of color in the image data indicating the brightness and contrast of the image, a distance from the biometric modality of the user to a camera capturing the image data of the biometric modality, the distance indicating the proximity of the user to the camera, time taken for the camera to focus on the biometric modality, ambient illumination in the image data, defects in the image data, background images in the image data, and temperature of sensors in the camera while capturing the image data;

compare each item of metadata associated with the received image data against a corresponding item of metadata associated with record image data of the user;

determine that each item of metadata associated with the received image data matches the corresponding item of metadata;

and in response to determining all items of metadata associated with the received image match the corresponding item of metadata associated with the record image data, deem the received image data to be fraudulent and not from a living person.

4. The electronic device according to claim 3, wherein when the received image data is deemed to be fraudulent the instructions when read and executed by said processor, further cause said electronic device to:

calculate a cryptographic image hash of the received image data;

compare the calculated cryptographic image hash against a record cryptographic image hash of the user; and when the hashes match, determine the received image data is a replay of the record image data.

5. A non-transitory computer-readable recording medium in an electronic device for enhancing user liveness detection, the non-transitory computer-readable recording medium storing instructions which when executed bya hardware processor cause the non-transitory recording medium to perform steps comprising:

receiving image data of a user, the image data including items of metadata, wherein the items of metadata comprise a time stamp indicating when the image data was captured, pixel density of the image data indicating the resolution of the image, an angle indicating the orientation of the camera relative to the biometric modality of the user, intensity of color in the image data indicating the brightness and contrast of the image, a distance from the biometric modality of the user to a camera capturing the image data of the biometric modality, the distance indicating the proximity of the user to the camera, time taken for the camera to focus on the biometric modality, ambient illumination in the image data, defects in the image data, background images in the image data, and temperature of sensors in the camera while capturing the image data;

comparing each item of metadata associated with the received image data against a corresponding item of metadata associated with record image data of the user;

determining that each item of metadata associated with the received image data matches the corresponding item of metadata;

and in response to determining all items of metadata associated with the received image match the corresponding item of metadata associated with the record image data, deeming the received image data to be fraudulent and not from a living person.

6. The non-transitory computer-readable recording medium according to claim 5, wherein when the received image data is deemed to be fraudulent the instructions when read and executed by said processor, cause said non-transitory computer-readable recording medium to perform the steps of:

calculating a cryptographic image hash of the received image data;

comparing the calculated cryptographic image hash against a record cryptographic image hash of the user; and when the hashes match, determining the received image data is a replay of the record image data.

* * * * *